United States Patent
Szuba

(10) Patent No.: US 9,638,261 B2
(45) Date of Patent: May 2, 2017

(54) COLLAPSIBLE SHAFT ASSEMBLY WITH FLANGED SLOTS

(71) Applicants: SZUBA CONSULTING, INC., Dearborn, MI (US); VALUE EXTRACTION LLC, Dearborn, MI (US)

(72) Inventor: Joseph A. Szuba, Dearborn, MI (US)

(73) Assignees: SZUBA CONSULTING, INC., Dearborn, MI (US); VALUE EXTRACTION LLC, Dearborn, MI (US)

(*) Notice: Subject to any disclaimer, the term of this patent is extended or adjusted under 35 U.S.C. 154(b) by 0 days.

(21) Appl. No.: 14/767,650

(22) PCT Filed: Feb. 18, 2014

(86) PCT No.: PCT/US2014/016887
§ 371 (c)(1),
(2) Date: Aug. 13, 2015

(87) PCT Pub. No.: WO2014/127352
PCT Pub. Date: Aug. 21, 2014

(65) Prior Publication Data
US 2016/0003303 A1    Jan. 7, 2016

Related U.S. Application Data

(60) Provisional application No. 61/765,908, filed on Feb. 18, 2013.

(51) Int. Cl.
*F16C 3/03*     (2006.01)
*F16D 1/10*     (2006.01)
(Continued)

(52) U.S. Cl.
CPC ............. *F16D 1/10* (2013.01); *B60K 17/22* (2013.01); *F16D 3/06* (2013.01); *B60Y 2306/01* (2013.01);
(Continued)

(58) Field of Classification Search
CPC ........ F16D 1/10; F16D 3/06; F16D 2001/103; B60K 17/22; B60Y 2306/01;
(Continued)

(56) References Cited

U.S. PATENT DOCUMENTS 2,283,943 A * 5/1942 Myer .................. E04B 1/48
                                                      403/283 X
4,572,022 A   2/1986 Mettler
(Continued)

FOREIGN PATENT DOCUMENTS

JP    2009269518 A    11/2009

*Primary Examiner* — Gregory Binda
(74) *Attorney, Agent, or Firm* — Carlson, Gaskey & Olds

(57) ABSTRACT

A drive shaft assembly for a vehicle includes a first tubular member and a second tubular member that is received by the first tubular member defining a coaxial relationship. The first tubular member defines a plurality of protuberances with each of the protuberances defining a side wall and the second tubular member defines a plurality of apertures with each of the apertures defined by a flange circumscribing the aperture and extending radially inwardly of second tubular member. Each aperture receives a protuberance so that the protuberance abuts the sidewalls of the aperture affixing the first tubular member to said second tubular member in a substantially fixed circumferential orientation.

12 Claims, 2 Drawing Sheets

(51) Int. Cl.
  *B60K 17/22* (2006.01)
  *F16D 3/06* (2006.01)
(52) U.S. Cl.
  CPC ... *F16D 2001/103* (2013.01); *Y10T 403/4974* (2015.01); *Y10T 403/4991* (2015.01); *Y10T 403/7035* (2015.01)
(58) Field of Classification Search
  CPC ......... Y10T 403/4974; Y10T 403/4991; Y10T 403/7035
  USPC ...... 464/162; 403/283, 285, 359.6; 280/777; 285/382.1
  See application file for complete search history.

(56) References Cited

U.S. PATENT DOCUMENTS

| | | | |
|---|---|---|---|
| 5,314,204 A | 5/1994 | DuRocher et al. | |
| 6,015,350 A | 1/2000 | Breese | |
| 6,754,943 B1* | 6/2004 | Perry | B23P 11/00 |
| 7,160,195 B2* | 1/2007 | Lyon | F16D 3/06 |
| | | | 464/162 |
| 8,226,490 B2 | 7/2012 | Szuba | |
| 2012/0010007 A1* | 1/2012 | Szuba | B21D 39/032 |

* cited by examiner

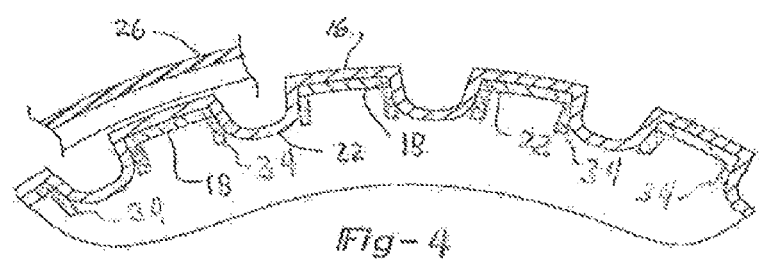
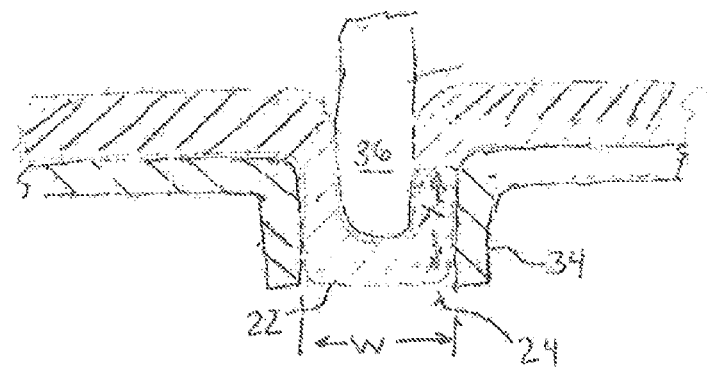
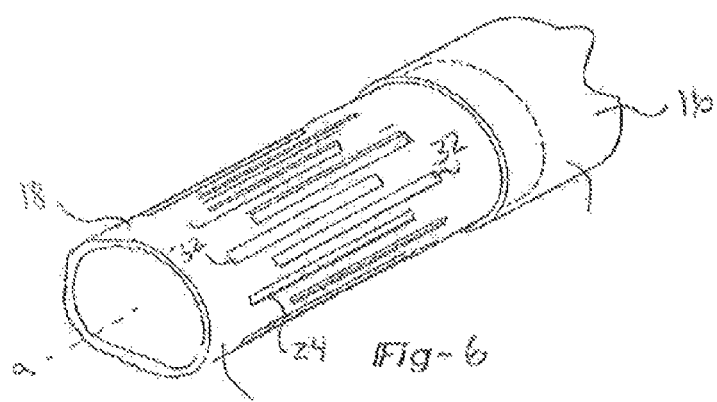

COLLAPSIBLE SHAFT ASSEMBLY WITH FLANGED SLOTS

CROSS-REFERENCE TO RELATED APPLICATIONS

The present application is the National Stage of International Patent Application No. PCT/US2014/16887, filed on Feb. 18, 2014, which claims priority to and all advantages of U.S. Provisional Patent Application No. 61/765,908 filed Feb. 18, 2013, the content of which is hereby incorporated by reference.

TECHNICAL FIELD

The present invention relates generally toward a collapsible shaft for use on a motor vehicle. More specifically, the present invention relates to a collapsible shaft having an improved interface between coaxial tubular members.

BACKGROUND

Shafts are used in motor vehicles in power train assemblies to transfer motive force from an engine to wheels propelling the vehicle and in steering columns to transfer motion from a steering wheel to a turning apparatus. Various designs have been implemented to enable the shaft to collapse in the event of a collision with another vehicle or stationary object. Typically, a collapsible shaft is assembled by inserting a first tube into a second tube and interconnecting the tubes to transfer circumferential force. Upon impact, the tubes collapse along an axis defined by the tubes. To date, none of the prior art designs have provided adequate circumferential or rotational force transfer between the tubes. Therefore, it would be desirable to provide a collapsible tube assembly to improve the transfer of circumferential or rotational force between the tubes.

SUMMARY

A drive shaft assembly for a vehicle includes a first tubular member and a second tubular member received by the first tubular member defining a coaxial relationship between the tubular members. The first tubular member defines a plurality of protuberances with each of the protuberances defining a side wall and the second tubular member defines a plurality of apertures. A flange circumscribing a respective one of the apertures extends radially inwardly of the second tubular member. Each of the plurality of apertures receives one of the plurality of protuberances such that the protuberances abut the respective flanges circumscribing the apertures affixing the first tubular member to the second tubular member in a substantially fixed circumferential orientation.

Prior art U.S. Pat. No. 8,226,490 to Szuba, the content of which is incorporated herein by reference, discloses an improvement over other collapsible shaft assemblies by forming a protuberance in a first tube into an aperture defined by a second tube that is inserted into the first tube. The improvement provides an abutting relationship between the protuberance formed into the first tube and the aperture defined by the second tube to enhance transfer of circumferential force between tubes. However, the present application discloses an improvement in transfer of circumferential force by increasing the surface area of contact between the protuberance and the second tube.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 shows a sectional view through line 4-4 of FIG. 2;
FIG. 5 shows a crossectional view of a form punch forming a protuberance into an aperture;
and
FIG. 6 shows a perspective view of an alternative embodiment of the subject invention.

DETAILED DESCRIPTION

Figure 1:
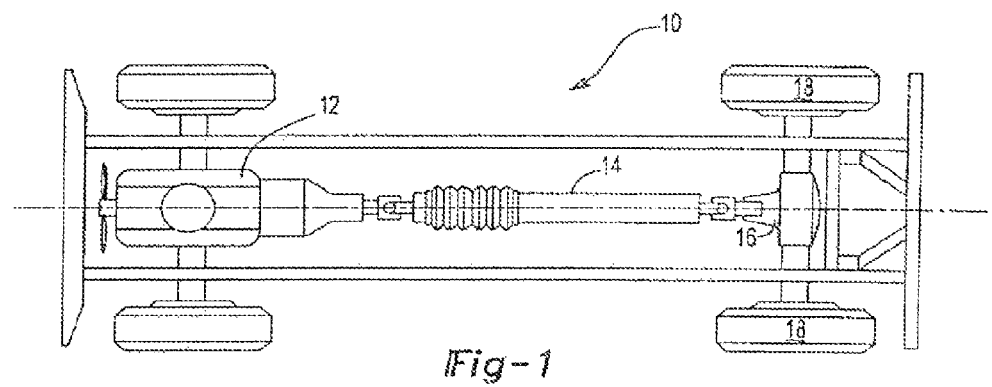
FIG. 1 shows a generic power train of a motor vehicle.

Referring to FIG. 1, a powertrain of a motor vehicle is generally shown at 10. The power train includes a motor 12 that transfers torque to a drive shaft assembly 14 in a known manner. It should be understood by those of skill in the art that although a drive shaft is an exemplary embodiment, other shafts, such as, for example, steering columns are included in this invention.

Figure 2:
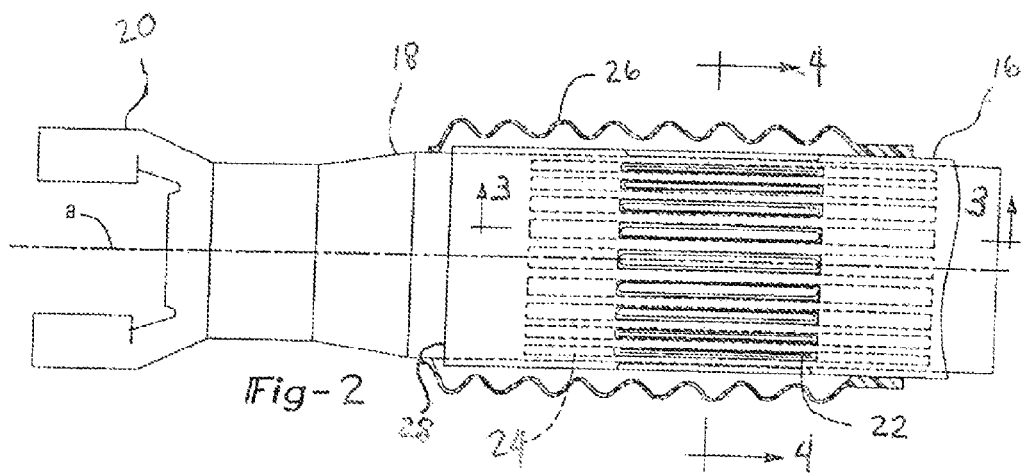
FIG. 2 shows a partial side view of a drive shaft assembly of the present invention.

Referring now to FIG. 2, the drive shaft assembly includes a first tubular member 16 that receives a second tubular member 18 so that the tubular members are slidably disposed along axis a. It should be understood by those of skill in the art that the diameter for the first tubular member 16 is greater than the diameter of the second tubular member 18 so that the second tubular member 18 is received by the first tubular member 16. Each tubular member 16, 18 is interconnected to a yoke 20 located at an end opposite the interface of the first and second tubular members 16, 18.

The first tubular member 16 defines a plurality of protuberances 22 extending radially inwardly toward the axis a. The protuberances 22 are circumferentially spaced around the first tubular member 16. Each protuberance 22 extends radially inwardly into a slot or aperture 24 defined by the second tubular member 18. Therefore, the slots or apertures 24 (shown in serrated lines in FIG. 2) are also circumferentially spaced around the second tubular member 18 in a similar manner as are the protuberances 22 circumferentially spaced around the first tubular member 16. It should be understood by those of ordinary skill in the art that the slots 24 are also pockets defined into the first tubular member. A boot 26 is secured over a proximal end 28 of the first tubular member 16 and is disposed in sealing engagement with an outer surface of both tubular members 16, 18 to prevent contamination from entering the interior of the drive shaft assembly 14.

Figure 3:
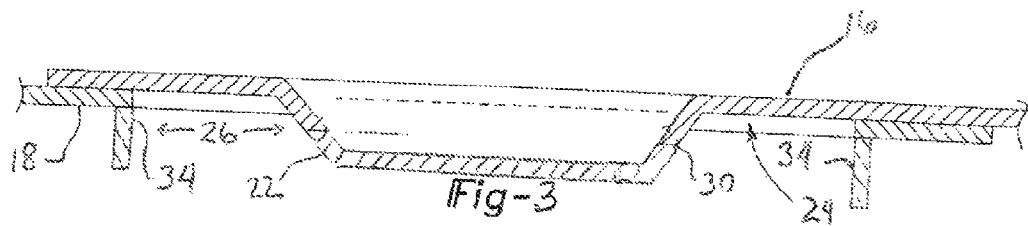
FIG. 3 shows a sectional view through line 3-3 of FIG. 2.

The slots 24 are contemplated to have an axial length that is greater than an axial length of the protuberances 22, as is best represented in FIG. 3, so that the tubular members 16, 18 articulate along the axis when necessary. For example, a space 26 is disposed between slot ends 32 of the slot 24 and ends of the protuberance 22. Therefore, should an impact of a motor vehicle result in compression of the drive shaft assembly 14, the protuberance 22 will slide freely in the slot 24 prior to reaching a slot end 32. Each protuberance 22 defines an inclined end wall 30 that will enhance collapse of the protuberance 22 should the drive shaft assembly 14 compress a distance in excess of the space 26 defined between the protuberance 22 and the slot ends 32.

FIG. 4 is a cross-sectional view along lines 4-4 of FIG. 2 and best shows the wall 34 disposed around a periphery of each slot 24. In this example, the wall 34 takes the form of a flange. The wall 34 enhances the bearing contact between the protuberance 22 of the first tubular member 16 and the second tubular member 18 by the depth (i.e., radial dimension) of the wall 34 shown as X in FIG. 5. The wall 34 encircles the entire periphery of each slot 24 and extends radially inwardly toward axis a.

Referring now to FIG. 5, a form punch 36 is used to deform each protuberance 22 into its corresponding slot 24. The protuberance 22 is deformed a depth X that corresponds to the depth X of the wall 34 of the slot 24 and a width that is substantially the same as a width of the aperture 24 between walls 34. The surface area of contact between the protuberance 22 and the wall 34 improves the transfer of torque between the tubular members 16, 18. It should be understood by those of skill in the art that by forming the protuberance 22 into the walled slot 24, a net/net interaction is established between the side walls of protuberance 22 and the slot 24. This contact between the protuberance 22 and the slot 24 affixes the first tubular member 16 to the second tubular member 18 in a substantially fixed circumferential orientation and eliminates problems associated with prior art splined tubular members where a net/net interaction is not possible due to manufacturing tolerances. It should be further understood by those of ordinary skill in the art that the slots 24 are formed by piercing the second tubular member 18 and extruding the slot wall 34 to a desired depth and shape. However, alternative methods of forming the slots 24 are also included within the scope of this invention.

FIG. 6 shows an alternate embodiment of the present invention where the slots 24 are staggered along the direction of axis a so that the slot ends 32 alternate as to the location of termination in the axial direction. It is contemplated by the inventor that the balance of the drive shaft assembly 14 is enhanced by orienting the slots 24 in this manner.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

The invention claimed is:

1. A drive shaft assembly for a vehicle, comprising:
   a first tubular member and a second tubular member received by said first tubular member thereby defining a coaxial relationship between said tubular members, said first tubular member defining a plurality of protuberances with each of said protuberances defining a side wall and
   said second tubular member defining a plurality of apertures with each of said apertures defined by a flange circumscribing said aperture and extending radially inwardly of said second tubular member, and
   each of said plurality of apertures receiving one of said plurality of protuberances such that each of said protuberances abut a respective said flange on opposite sides of the respective said aperture and thereby affixing said first tubular member to said second tubular member in a substantially fixed circumferential orientation.

2. The assembly set forth in claim 1, wherein said plurality of apertures define a length along an axis of said first and second tubular members and said plurality of protuberances define a length along said axis of said first and second tubular members shorter than said length of said plurality of apertures thereby allowing said first tubular member to move axially relative to said second tubular member.

3. The assembly set forth in claim 1, wherein each of said plurality of protuberances define a protuberance width and each of said plurality of apertures define an aperture width, said widths being substantially the same thereby reducing circumferential movement between said first tubular member and said second tubular member.

4. The assembly set forth in claim 1, wherein each of said plurality of protuberances is collapsible during axial movement of said first tubular member relative to said second tubular member exceeding one half a difference in a length of said plurality of protuberances and a length of said plurality of said apertures.

5. The assembly set forth in claim 1, wherein each said flange extends radially inwardly a depth that is substantially the same as a depth of a respective said protuberance extends radially inwardly.

6. The assembly set forth in claim 1, wherein each of said plurality of protuberances is circumferentially spaced in a common axial relationship.

7. The assembly set forth in claim 1, wherein said apertures are staggered along an axis defined by said first tubular member and said second tubular member.

8. The assembly set forth in claim 1, wherein the apertures are formed by piercing the second tubular member.

9. The assembly set forth in claim 8, wherein the flanges circumscribing the respective apertures are extruded to a desired depth in toward a center of the second tubular member.

10. The assembly set forth in claim 1, wherein each said flange comprises a flat, planar section of a material of the second tubular member.

11. The assembly set forth in claim 1, wherein said protuberances are formed into said apertures by a punch.

12. The assembly set forth in claim 11, wherein said protuberances are formed into said apertures a depth corresponding to a depth said flange extends into said second tubular member and a surface area of contact between said protuberance and said flange extends across said depth.

* * * * *